UNITED STATES PATENT OFFICE.

JOSEPH F. MENNINGEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

METHOD OF FORMING AN ARTICLE FROM AN INSULATING COMPOSITION.

1,162,092.  Specification of Letters Patent.  Patented Nov. 30, 1915.

No Drawing.   Application filed March 12, 1909.   Serial No. 483,049.

*To all whom it may concern:*

Be it known that I, JOSEPH F. MENNINGEN, a citizen of the United States, residing at Milwaukee, in the county of Milwaukee and State of Wisconsin, have invented certain new and useful Improvements in Methods of Forming an Article from an Insulating Composition, of which the following is a full, clear, and exact specification.

This invention relates to new and useful improvements in insulating compositions or compounds and to the methods of forming the same.

The object of the invention is the provision of a compound which is exceedingly hard, strong and durable, which has some degree of flexibility and is not easily fractured, which is absolutely fire-proof, water and oil-proof, and possesses excellent insulating properties.

The principal ingredients of my improved insulating compound are sand, preferably of a very fine grain, asbestos and shellac or other equivalent substance possessing like qualities as a binder in the composition; and if desired, some coloring matter may be added. The asbestos will be either fibrous or ground into a powder depending on the purpose and to some extent on the particular shape of the article which is to be made. The proportions by weight of the ingredients which I have found by careful experiment to produce a compound which answers all the requirements most effectively are substantially as follows: Five parts of sand, three parts of asbestos, four parts of shellac, and one-eighth part of coloring matter, if the latter is added.

In carrying out my invention, the shellac having been dissolved in a suitable amount of alcohol to give the proper working consistency (about equal parts of gum shellac and alcohol have been found satisfactory), the parts are thoroughly mixed so as to produce a mixture or composition having substantially the consistency of soft putty. This mixture is then subjected simultaneously to both heat and pressure, this being preferably accomplished by placing the mixture in a hot mold and compressing the same in a suitable press, such as a hand press. The mixture is then allowed to stand, the pressure of the press having been removed, and bake in the mold for a short time, say from one to two minutes, and is then again subjected simultaneously to both heat and pressure in the press, the mold being preferably reheated in order that the mixture may be heated to the proper temperature. This second heating and compressing operation completes the formation of the compound, which is then cooled preferably by being placed in cold water.

The first step of the molding operation, consisting of subjecting the mixture to heat and pressure simultaneously, accomplishes the result, through the applied pressure, of forcing the mixture to the various parts of the mold, and this is no small matter where the molded article is provided with small projections and sharp-angled recesses. This will be appreciated since the consistency of the mixture is only such as is produced by a limited amount of alcohol, the only thinning material employed to bring the composition to a workable consistency. The heat applied to the mixture during this pressing is sufficient to bring the temperature to a point where the alcohol will be readily evaporated, and, if the article is of small mass, the alcohol may be evaporated even while the pressure is being applied. Ordinarily, however, especially with larger articles, when pressure has been applied to a sufficient degree to cause the mixture to fill the mold, the molded mass is relieved of pressure and allowed to stand while subjected to heat alone, thus effecting, to some extent, a baking of the article. During this period, the alcohol used in obtaining a workable mixture is evaporated. The heat necessary to accomplish the required evaporation may be directly applied to the mold while the same is standing unsubjected to pressure, or, as is possible, the heat applied during the first combined pressing and heating operation may be sufficient, without any further heat application, to penetrate to the interior in a short while and accomplish the required evaporation. Ordinarily, during this second step of the operation, heat is applied to the mold, but it will be apparent that the feature of this step is allowing heat to act on the molded mass, while not subjected to pressure, to cause the evaporation of the alcohol.

While with articles of small mass, the evaporation necessary may be accomplished while pressure is being applied, nevertheless, the absence of applied pressure allows the alcohol to escape much more readily from the mold; and, further, the requisite evaporation cannot be accomplished with large articles, since the evaporated alcohol cannot escape readily, and may even be sufficient to cause an explosion of the mold when pressure is applied continuously.

After it has been subjected to heat alone for a comparatively short time, the mold is again subjected to both heat and pressure. This heat and pressure acts to compact the molded mass, which has shrunk perceptibly, due to the evaporation of alcohol, and to completely bake the molded article and render the same close-grained, hard and firm.

It is to be noted that two pressing operations are necessary in most cases, the one to properly fill the mold and to impart the desired shape to the molded article, and the other to thoroughly compact the molded article after the alcohol has been evaporated. It is desirable that the mixture be subjected to heat from the time it is put in the mold, in order to quickly and efficiently rid the molded mass of alcohol and to thoroughly bake and harden the molded article.

A compound formed of the materials and proportions above named and in the manner above described is found to answer all the necessary requirements very effectively and at the same time is easy and inexpensive to manufacture.

What I claim as new and desire to secure by Letters Patent is:

1. The method of forming an article from insulating compound which consists in mixing together substantially five parts of sand, three parts of asbestos, and four parts of shellac, subjecting the mixture to heat and pressure simultaneously, then for an interval to heat alone, and then again to heat and pressure simultaneously.

2. The method of forming an article from an insulating composition which comprises preparing a mixture including a binder of shellac and a solvent therefor, subjecting the mixture to the action of heat and pressure simultaneously to shape the article, then for an interval to the action of heat alone to volatilize said solvent, and then to the action of heat and pressure simultaneously.

3. The method of forming an article from an insulating composition which comprises preparing a mixture including a binder and a solvent therefor of a readily volatile nature, subjecting the mixture to the action of heat and pressure simultaneously to shape the article, then for an interval to the action of heat alone to cause volatilization of said solvent, and then to the action of heat and pressure simultaneously.

In testimony whereof I affix my signature, in the presence of two witnesses.

JOSEPH F. MENNINGEN.

Witnesses:
H. C. CASE,
CHAS. L. BYRON.